US010563037B2

(12) United States Patent
Gane et al.

(10) Patent No.: US 10,563,037 B2
(45) Date of Patent: *Feb. 18, 2020

(54) METHOD OF PREPARING A COATING COMPOSITION COMPRISING SUBMICRON CALCIUM CARBONATE

(71) Applicant: Omya International AG, Oftringen (CH)

(72) Inventors: Patrick A. C. Gane, Rothrist (CH); Detlef Gysau, Oberbözberg (CH); George Saunders, Brandon, VT (US); Joseph McJunkins, Middleburg Heights, OH (US)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,841

(22) Filed: Feb. 27, 2014

(65) Prior Publication Data

US 2014/0179852 A1    Jun. 26, 2014

Related U.S. Application Data

(62) Division of application No. 13/522,768, filed as application No. PCT/EP2011/050953 on Jan. 25, 2011, now Pat. No. 10,557,012.

(60) Provisional application No. 61/400,648, filed on Jul. 30, 2010.

(30) Foreign Application Priority Data

Jan. 26, 2010 (EP) .................................... 10151721

(51) Int. Cl.
| C09D 7/61 | (2018.01) |
| C08K 3/22 | (2006.01) |
| C08K 3/26 | (2006.01) |
| C09D 7/40 | (2018.01) |
| C08K 3/30 | (2006.01) |

(52) U.S. Cl.
CPC .................. *C08K 3/22* (2013.01); *C08K 3/26* (2013.01); *C08K 3/30* (2013.01); *C09D 7/61* (2018.01); *C09D 7/67* (2018.01); *C09D 7/68* (2018.01); *Y10T 428/258* (2015.01)

(58) Field of Classification Search
CPC ...... C09D 7/1258–1275; C09D 7/1275; C09D 7/67–68; C09C 1/021–024; C09C 1/3653; C09C 1/3661; C09C 3/04–041; C01P 2004/62
See application file for complete search history.

(56) References Cited

U.S. PATENT DOCUMENTS

| 3,838,085 A | 9/1974 | Myers et al. |
| 4,344,991 A | 8/1982 | Gray |
| 5,171,631 A | 12/1992 | Adkins |
| 5,533,678 A * | 7/1996 | Strauch .................. C01F 11/185 241/16 |
| 5,886,069 A | 3/1999 | Bolt |
| 5,914,373 A * | 6/1999 | Glancy ................ C08G 12/424 525/406 |
| 6,143,064 A | 11/2000 | Virtanen |
| 6,638,998 B2 * | 10/2003 | Zhao et al. .................... 524/127 |
| 6,743,286 B2 | 6/2004 | Wen et al. |
| 2009/0162638 A1 | 6/2009 | Buri et al. |
| 2009/0281207 A1 | 11/2009 | Stratton et al. |
| 2010/0074827 A1* | 3/2010 | Rainer .................. C01F 11/185 423/430 |

FOREIGN PATENT DOCUMENTS

| CN | 1335874 A | 2/2002 | |
| EP | 1764345 A1 | 3/2007 | |
| EP | 1784345 A1 | 3/2007 | |
| GB | 1404564 | 9/1975 | |
| GB | 1404564 A * | 9/1975 | ............... C09C 1/02 |
| JP | 61023658 A * | 2/1986 | |
| JP | 2006/111980 A | 4/2006 | |
| WO | WO 9201518 A1 * | 2/1992 | ............. C09C 1/021 |
| WO | 0039222 A1 | 7/2000 | |
| WO | 200508316 A1 | 9/2005 | |
| WO | 2009137504 A2 | 11/2009 | |

OTHER PUBLICATIONS

Sample Dispersion & Refractive Index Guide. Malvern Instruments. 1997.*
Written Translation of JPS61-23658A. Feb. 1, 1986.*
Limestone information. CAMEO Chemicals. https://cameochemicals.noaa.gov/chemical/25038. As viewed on Jul. 19, 2017.*
What is PCC—Precipitated Calcium Carbonate? http://www.mineralstech.com/Pages/SMI/Precipitated-Calcium-Carbonate-(PCC).aspx. Specialty Minerals Inc. As viewed on Dec. 19, 2017 (Year: 2017).*
The Opposition dated Apr. 1. 2014 for European Application No. EP 10151721.7.
Kirk-Othmer Concise Encyclopaedia of Chemical Technology, Copyright 1985 by John Wiley & Sons, Inc., pp. 887-888.
Handbook of Mineralogy, Copyright 2001-2005, Mineral Data Publishing, section for Anatase, http://rruff.info/doclib/hom/anatase.pdf.
Dietz "Spacing for better effects." European Coatings Journal, Issue 07-08, 2003.

(Continued)

*Primary Examiner* — Stephen E Rieth
(74) *Attorney, Agent, or Firm* — Heslin Rothenberg Farley & Mesiti P.C.

(57) ABSTRACT

Coating composition providing gloss and opacity on application, having a pigment volume concentration of from 5% up to the critical pigment volume concentration and characterised in that comprises at least one ground natural calcium carbonate having a volume median diameter of between 0.05 and 0.3 μm, and at least one pigment having a refractive index of greater than or equal to 2.5.

15 Claims, No Drawings

(56) References Cited

OTHER PUBLICATIONS

Werner, R entitled "Effect of Extenders with Narrow and Broad Particle Size Distributions of the Properties of Coatings," Journal of Coatings Technology, 2000, vol. 72, No. 903, pp. 71-76.
Calcium carbonate properties, Aldrich Chemical, http://www.sigmaaldrich.com/catalog/product/sial/c6763?lang=en®ion+US. As viewed on Mar. 11, 2014.
The Office Action dated Aug. 13, 2013 for related Chinese Application No. 201180007156.7.
The International Search Report dated Mar. 22, 2011 for PCT Application No. PCT/EP2001.050953.
The Written Opinion of the International Searching Authority for PCT Application No. PCT/EP2001.050953.
Asbeck et al. "Critical Pigment Volume Relationships." Industrial and Engineering Chemistry 1949, vol. 41, Issue 7, pp. 1470-1475.
Titanium (IV) Oxide Properties. Aldrich Chemical. http://www.sigmaaldrich.com/catalog/product/sial/14021?lang=en&region=US. As viewed on Feb. 5, 2014.

\* cited by examiner

METHOD OF PREPARING A COATING COMPOSITION COMPRISING SUBMICRON CALCIUM CARBONATE

CROSS-REFERENCE TO RELATED APPLICATIONS

This is a divisional of U.S. application Ser. No. 13/522,768, filed Sep. 7, 2012, which is a U.S. national phase of PCT Application No. PCT/EP2011/050953, filed Jan. 25, 2011, which claims priority to European Application No. 10151721.7, filed Jan. 26, 2010 and U.S. Provisional Application No. 61/400,648, filed Jul. 30, 2010, the entirety of which are hereby incorporated by reference.

The present invention relates to glossing and opacifying coating compositions comprising submicron natural ground calcium carbonate. The invention further relates to a process to prepare a glossing and opacifying coating composition implementing submicron natural ground calcium carbonate, and to the use of submicron natural ground calcium carbonate in glossing and opacifying coating compositions.

Mineral pigments are widely used in coating systems, not only to decrease formulation costs but further to improve certain properties of the coating formulation, during its preparation or storage, or during or following its application to a substrate. In the realm of paint formulations, coating systems almost invariably implement titanium dioxide.

In the context of paint applications, pigments with a refraction index of at least 2.5 are highly appreciated. One especially preferred pigment in this respect is titanium dioxide ($TiO_2$), particularly when of the rutile form having a refractive index of 2.7 (Light Scattering by Pigmentary Rutile in Polymeric Films, Richard A. Slepetys, William F. Sullivan *Ind. Eng. Chem. Prod. Res. Dev.*, 1970, 9 (3), pp 266-271) for providing significant opacity or hiding power. Titanium dioxide pigments marketed for use in paint formulation are well known to present a narrow particle size distribution along with a median particle diameter of between 0.2 and 0.6 µm, depending on the material and the mean particle size measurement method. Zinc sulphide and zinc oxide are similarly employed.

Titanium dioxide suffers however from being relatively high in cost, resulting in a continued desire to find lower-cost $TiO_2$ partial replacement pigments that do not translate in a reduction of optical and other coating composition properties.

GB1404564 describes ultrafine natural calcium carbonate filled paints and pigments, wherein said natural calcium carbonate has a particle diameter of from 0.5 to 4 µm and is employed to partially replace titanium dioxide. In this vein, Polcarb™ (commercialized by the company Imerys) is said to be suitable for glossing paint formulations, which has a mean particle size of 0.9 µm. However, such natural calcium carbonate products do not allow the replacement of a part of $TiO_2$ in glossing paint formulation having a pigment volume concentration below the critical pigment volume concentration, without loss of gloss or opacity.

For the purpose of the present invention, the pigment volume concentration (PVC) is understood to refer to the fraction, quoted in % of pigment volume relative to the total volume of the pigment plus the other components of the formulation, i.e. it accounts for the pigment volume relative to the total formulation volume in the final (dried; i.e. excluding water or other solvent) coating.

The critical pigment volume concentration (CPVC) is defined as the pigment volume concentration as of which, if exceeded, the resin component of the coating formulation is no longer sufficient to entirely coat all of the pigment particles in a coating. It is well known that above the CPVC, formulations generally provide a matt finish. By contrast, glossy paint formulations implement a PVC that is below the CPVC.

U.S. Pat. No. 5,171,631 discloses a coating composition for developing hiding on a suitable substrate, the coating composition having a pigment volume concentration (PVC) up to a critical pigment volume concentration (CPVC) and a pigment system comprising about 70-98% by volume of titanium dioxide and about 2-30% by volume of an aluminium trihydrate (ATH) spacer/extender pigment having a medium particle size of about 0.2 microns. FIG. 1 of U.S. Pat. No. 5,171,631 shows a $d_{98}/d_{50}$ ratio value of approximately 2.7, which corresponds to a relatively narrow particle size distribution. Although it is stated that, provided this ATH has a median particle size and particle size distribution generally similar to the median particle size and particle size distribution curve of $TiO_2$, a portion of $TiO_2$ may be replaced with an equal volume of ATH with no loss of hiding, FIG. 2 of U.S. Pat. No. 5,171,631 shows that the ATH—$TiO_2$-comprising paint formulations generally fail to achieve the same opacity values as the control paint formulation comprising $TiO_2$ alone.

Natural ground calcium carbonate (GCC), as opposed to its synthetic counterpart, precipitated calcium carbonate (PCC), generally suffers in this application field from a broad particle size distribution and irregular particle shapes. Indeed, as natural ground calcium carbonate is prepared by the grinding down of mined calcite, marble, chalk or limestone-containing stones, it is difficult to ensure that these stones are ultimately fractioned to form fine particles having a very uniform particle size.

By contrast, PCC is formed by a process of building crystals around nucleation sites. Control of nucleation and particle size development, particularly in the size domain under a few micrometers, during PCC precipitation, has, over the years, become a well studied science, and PCC particles having small and very uniform particle sizes and shapes are now widely available. As in U.S. Pat. No. 5,171,631, the advantages of employing a uniform particle size product as a titanium dioxide spacer are known. In this domain, Specialty Minerals advertises Albafil PCC, a fine, 0.7 micorn prismatic calcite, and a range of ultrafine or nano PCCs, namely Calofort S PCC, Calofort U PCC, Ultra-Pflex PCC and Multifex MM PCC, each having a median diameter of 0.07 micron, stating that precipitated calcium carbonate (PCC) is most commonly used in paint as an extender for titanium dioxide $TiO_2$. The small and narrowly distributed PCC particles help space the individual $TiO_2$ particles and maximize their hiding power.

In view of the above teachings of the prior art, it was remarkable that the Applicant found that a ground natural calcium carbonate that is finer than ground natural calcium carbonate products previously offered in this domain, may be used as a replacement or complementary pigment for pigments with a refraction index of at least 2.5, especially $TiO_2$, even in the case when this ground natural calcium carbonate features a relatively broad particle size distribution and/or a median diameter that is different from that of the pigment to be replaced. By contrast to the results of U.S. Pat. No. 5,171,631 achieved with ATH, the ground natural calcium carbonate employed in the present invention not only more fully maintains the gloss and opacity of the paint formulation when used to replace part of the formulation pigment such as $TiO_2$ at constant PVC, it may even lead to a gloss and/or opacity improvement.

A first object of the present invention is accordingly a coating composition having the same or even improved gloss and opacity as a coating composition of pigments with a refraction index of at least 2.5, but wherein the content of this pigment is reduced at the same PVC.

The solution of this problem according to the present invention is a coating composition having a pigment volume concentration (PVC) of from 5 vol.-% up to the critical pigment volume concentration (CPVC), which comprises at least one ground natural calcium carbonate having a volume median diameter $d_{50}$ of between 0.05 and 0.3 µm, (hereafter submicron ground natural calcium carbonate, SMGCC), and at least one pigment having a refractive index of greater than or equal to 2.5.

For the purpose of the present application, CPVC is determined according to the measurement method given in the examples section herebelow.

For the purpose of the present invention, the volume median diameter $d_{50}$ ($d_{50}$ (Mal)) and the $d_{98}$ ($d_{98}$ (Mal)) are measured according to the Malvern measurement method provided in the examples section herebelow.

In this respect, the $d_{50}$ and $d_{98}$ values define the diameters, at which 50 vol.-% of the particles measured have a diameter smaller than the $d_{50}$, and at which 98 vol.-% of the particles measured have a diameter smaller than the $d_{98}$ value, respectively.

Preferably, the coating composition has a PVC of from 10 to 30 vol.-%, more preferably 15 to 25 vol.-%, even more preferably 17 to 21 vol.-%, e.g. 19 vol.-%.

Preferably, said SMGCC has a volume median diameter $d_{50}$ of between 0.08 and 0.3 µm, preferably of between 0.1 and 0.2 µm, e.g. 0.15 µm.

Thus, according to the present invention, it is not only preferred to use submicron particles, but it is even possibly and advantageous to use SMGCC particles having a volume median diameter $d_{50}$ in the low nanometer range.

In one embodiment, said SMGCC has a $d_{98}/d_{50}$ of greater than 3. As indicated above and in contrast to the prior art, this ground natural calcium carbonate may, in an optional embodiment, have a particle size distribution that is broad and dissimilar to the particle size distribution of said pigment having a refractive index of greater than or equal to 2.5 employed in the composition. Indeed, even a bi- or multimodal SMGCC particle size distribution may be envisioned.

As shown in the examples section herebelow, it is not necessary that said SMGCC have a volume median diameter $d_{50}$ that is equivalent to the volume median diameter $d_{50}$ of said pigment having a refractive index of greater than or equal to 2.5, though this embodiment is not excluded from the present invention. The volume median diameter $d_{50}$ of SMGCC may differ from the volume median diameter $d_{50}$ of said pigment having a refractive index of greater than or equal to 2.5 by up to approximately 0.4 µm, preferably up to 0.3 µm, especially up to 0.2 µm.

Furthermore, as shown by the examples section herebelow, said SMGCC may feature a broad and even non-uniform particle size distribution relative to the distribution of said pigment having a refractive index of greater than or equal to 2.5 is, though again this does not exclude the case where the particle size distributions of SMGCC and said pigment having a refractive index of greater than or equal to 2.5 is are similar in breadth.

In a preferred embodiment, said SMGCC has a $d_{98}$ of less than or equal to 1 µm, more preferably of less than or equal to 0.8 µm, even more preferably of less than or equal to 0.6 µm, e.g. 0.5 µm and even more preferably of less than or equal to 0.4 µm, e.g. 0.3 µm.

Preferably, said SMGCC has a refraction index of approximately 1.4 to 1.8, more preferably of about 1.5 to 1.7, e.g. 1.6.

In another preferred embodiment, said pigment having a refractive index of greater than or equal to 2.5 is selected from one or more of the group comprising titanium dioxide, zinc sulphide and zinc oxide. In a more preferred embodiment, said pigment having a refractive index of greater than or equal to 2.5 is titanium dioxide.

If the pigment having a refractive index of greater than or equal to 2.5 is titanium dioxide, it is preferred that the titanium dioxide:SMGCC weight ratio is of 70:30 to 98:2, and it is even more preferred that the titanium dioxide:SMGCC weight ratio is of 75:25 to 90:10, most preferably the titanium dioxide:SMGCC weight ratio is of 80:20 to 85:15, e.g. 88:12.

In an alternative embodiment, the coating composition according to the present invention further comprises one or more materials selected from the group comprising clay, talc, magnesium carbonate, precipitated calcium carbonate (PCC), barium sulphate, mica and bentonite. In the case where magnesium carbonate is implemented in combination with SMGCC, this may be in the form of a dolomite.

It is an especially preferred embodiment of the invention that the gloss and/or opacity of the coating composition according to the invention is equal to or greater than the gloss and/or opacity of the same composition implementing the same amount of said pigment having a refractive index of greater than or equal to 2.5 in place of said ground natural calcium carbonate having a $d_{50}$ of between 0.05 and 0.3 µm.

For the purpose of the present invention, the gloss of a coating composition applied to a substrate is measured according to the measurement method provided in the examples section herebelow.

For the purpose of the present invention, the opacity of a coating composition applied to a substrate is measured according to the measurement method provided in the examples section herebelow.

In an especially preferred embodiment the coating composition of the present invention is characterised in that the gloss of the composition is within a range of ±10% of the gloss of a composition wherein the SMGCC is fully replaced by said pigment having a refractive index of greater than or equal to 2.5 at a constant PVC value in the range of from 5 vol.-% up to the CPVC.

Preferably, the gloss of the coating composition according to the present invention is within a range of ±5%, and more preferably within a range of ±3%, of the gloss of a composition wherein the SMGCC is fully replaced by said pigment having a refractive index of greater than or equal to 2.5.

It is especially preferred that the gloss of the coating composition is increased by at least 1% relative to the gloss of a composition wherein the SMGCC is fully replaced by said pigment having a refractive index of greater than or equal to 2.5. Relative to this embodiment, the gloss of the coating composition of the present invention is preferably increased by at least 5% relative to the gloss of the composition wherein the SMGCC is fully replaced by said pigment having a refractive index of greater than or equal to 2.5.

In a preferred embodiment, said SMGCC is dispersed with one or more dispersants. Conventional dispersants known to the skilled person can be used. The dispersant can be anionic, cationic or non-ionic. A preferred dispersant is based on polyacrylic acid.

Said coating composition may be applied to a variety of substrates, including but not limited to concrete, wood, paper, metal and board.

In a preferred embodiment, said coating composition is applied to a substrate in an amount so as to form a layer having a thickness of between 40 and 400 μm, preferably of between 100 to 350 μm, more preferably of between 150 to 300 μm, e.g. between 200 and 250 μm.

Following application to a substrate, said coating composition preferably provides a gloss measured at 60° according to DIN 67 530 of at least 70%, more preferably of at least 75%, especially at least 80%.

Following application to a substrate, said coating composition preferably provides an opacity (contrast ratio) determined according to ISO 6504/3 of at least 95%, more preferably at least 97%, especially at least 98%.

Said coating composition may further include one or more components selected from the group comprising; resins, such as latex or acrylate-based binders, preferably in the form of an aqueous emulsion; pigments, such as titanium dioxide; additives, such as defoamers, levelling agents, flatting agents, preservatives, optical brighteners, light stabilizers and rheological additives, such as thickeners, dispersants; solvents, such as glycol ethers and fillers, such as hollow-sphere polymeric pigments (Ropaque™).

Generally, any additives, which can usually used in water based coatings, which are well-known in the art may be used in the present invention. Such additives include, but are not limited to binders, such as latex, which may be based on pure acrylic compounds, styrene acrylic compounds, vinyl acrylic compounds, styrene butadiene, ethylene vinyl acetate, vinyl acetate, poly vinyl acetate, starch polymers, etc.; alkyds, e.g. of the water reducible and emulsified types, such as soya oil, tall oil, which may be silicone modified, polyurethane modified, etc.; polyurethanes, which may be both solvent containing or solvent free.

Further additives include titanium dioxide (rutile or anatase), and common pigments and/or fillers such as zinc oxide, nephelene syenite, diatomaceous earth, aluminum silicates, calcined clays, ball clays, water washed clays, barium sulphate, magnesium silicate, quartz, mica, and wollastonite, as well as colored inorganic and organic pigments.

Further additives, which may be useful in the present invention include solvents such as aromatic and aliphatic hydrocarbons, mineral spirits, naphtha, propylene and ethylene glycols, etc.; coalescing solvents such as texanol, butyl carbitol, butyl diglycol, butyl cellosolve, diethylene glycol mono methyl/butyl/hexyl/ethyl ethers, etc.; plasticizers such as various phthalates, such as dibutyl, diethyl, dioctyl, dimethyl, benzyl, dialkyl phthalates, etc.; anti settling agents, such as attapulgite clay, cellulosic thickeners (e.g. HEC, HMEC, HMPC, etc); dispersants, such as polyacrylates, which may be sodium, ammonium, and/or potassium neutralized, and/or hydrophobically modified; surfactants such as anionic or non-ionic surfactants; rheology modifiers such as associative and non-associative acrylics, and polyurethanes; defoamers, which may be mineral oil based, silicone based, etc.; biocides, e.g. those commonly used for in can preservation; mildewcides, e.g. those commonly used for resistance to mildew of dried paints; driers, especially those typically used with emulsified alkyds/water reducible alkyds; a wide variety of metals such as cobalt, zinc, zirconium, calcium, manganese, etc.; UV-absorbers, such as those typically used in either UV cure systems, or in some wood stains and finishes; stabilizers such as hindered amine light stabilizers, e.g. those typically used in either UV cure systems, or in some wood stains and finishes in combination with UV absorbers.

Further additives, which may be used in the present invention are any one commonly used in coating and paint formulations, and can be found in corresponding textbooks, and guidelines known to the person skilled in the art such as the VdL-Richtlinie "Bautenanstrichstoffe" (VdL-RL 01/Juni 2004; published by Verband der deutschen Lackindustrie e.V.).

Preferably, the coating composition has a Brookfield viscosity of from 200 to 500 mPa·s, more preferably of from 250 to 400 mPa·s, e.g. 300 mPa·s, as measured according to the measurement method provided in the examples section herebelow.

A further object of the present invention resides in a process to prepare a coating composition according to the invention.

Accordingly the present invention also relates to a process to prepare a coating composition having a PVC of from 5 vol.-% up to the CPVC, which is characterised by the following steps:

a) at least one ground natural calcium carbonate (SMGCC) having a volume median particle diameter $d_{50}$ of between 0.05 and 0.3 μm is provided;
b) at least one pigment having a refractive index of greater than or equal to 2.5 is provided;
c) said SMGCC of step a) is mixed with said pigment of step b).

Said SMGCC of step a) may be provided in the form of an aqueous suspension, an aqueous dispersion or dry powder. In a preferred embodiment, said SMGCC of step a) is provided in the form of an aqueous suspension or dispersion.

Furthermore, it is preferred that, additionally, at least one resin is provided, which is mixed with said SMGCC of step a) and said pigment of step b).

Said resin is preferably a latex and/or acrylate-based binder, said acrylate-based binder preferably being in the form of an aqueous emulsion.

Furthermore, a third object of the present invention lies in the use of at least one ground natural calcium carbonate having a volume median particle diameter $d_{50}$ of between 0.05 and 0.3 μm, in a coating composition having a PVC in the range of from 5 vol.-% up to the CPVC comprising at least one pigment having a refractive index of greater than or equal to 2.5.

In this respect, it is preferred that the gloss and/or opacity of the composition of the present invention is equal to or greater than the gloss and/or opacity of a composition wherein the SMGCC is fully replaced by said pigment having a refractive index of greater than or equal to 2.5.

Another object of the present invention is a paint comprising the coating composition of the invention.

EXAMPLES

Suspension or Dispersion Solids Content (% Equivalent Dry Weight)

The weight of the solid material in a suspension or dispersion is determined by weighing the solid material obtained by evaporating the aqueous phase of suspension and drying the obtained material to a constant weight.

Particle size distribution (volume % particles with a diameter<x), volume median grain diameter $d_{50}$, and $d_{98}$ (diameter at which 98 vol.-% of the particles are finer than $d_{98}$) of particulate material.

Volume median grain diameter $d_{50}$ was evaluated using a Malvern Mastersizer 2000 (Fraunhofer). The $d_{98}$ value, measured using a Malvern Mastersizer 2000 (Fraunhofer), indicates a diameter value such that 98% by volume of the particles have a diameter of less than this value.

BET Specific Surface Area (m²/g)

BET specific surface area values were determined using nitrogen and the BET method according to ISO 9277.

Gloss of a Coated Surface

Gloss values are measured at the listed angles according to DIN 67 530 on painted surfaces prepared with a coater gap of 150 and 300 µm on contrast cards.

Contrast Ratio (Opacity) of a Coated Surface

Contrast ratio values are determined according to ISO 6504/3 at a spreading rate of 7.5 m²/l.

Suspension or Dispersion Brookfield-Viscosity (mPas)

Brookfield-viscosities are measured with a Brookfield DV-II Viscometer equipped with a LV-3 spindle at a rotation rate of 100 rpm and room temperature (20±3° C.).

Pigment Volume Concentration (PVC, %)

The pigment volume concentration is calculated as described in Section 6.2.3 of the book entitled "Fuellstoff" by Detlef Gysau (Hannover: Vincentz Network 2005).

$$\frac{\text{Total sum by volume of all pigments} + \text{extenders in paint} \times 100\%}{\text{Total sum by volume of all solid ingredients in paint}}$$

Critical Pigment Volume Concentration (CPVC, %)

The critical pigment volume concentration is a well known concentration widely used in the paint industry. CPVC in traditional coatings is considered to be the volume of pigment in relation to binder at which there is just enough binder to wet the pigment and at which the mix theoretically exhibits zero porosity (cf. e.g. "Estimation of Critical Pigment Volume Concentration in Latex Paint Systems Using Gas Permeation, Manouchehr Khorassani, Saeed Pourmandian, Faramarz Afshar-Taromi, and Amir Nourhani, Iranian Polymer Journal 14 (11), 2005, 1000-1007). The CPVC and its measurement method according to ISO 4618 are discussed in Section 6.2.4 of the book entitled "Fuellstoff" by Detlef Gysau (Hannover: Vincentz Network 2005).

Materials:

SMGCC

SMGCC dispersions used in the following examples are natural ground calcium carbonate (marble from Vermont) having the volume median particle size $d_{50}$ and particle size characteristics given in the table below.

| SMGCC | Solids (wt-%) | SSA (m²/g) | vol.-% < 1 µm | vol.-% < 0.5 µm | vol.-% < 0.2 µm | $d_{98}$ (µm) | $d_{50}$ (µm) | $d_{98}/d_{50}$ |
|---|---|---|---|---|---|---|---|---|
| 1 | 60 | 36.0 | 98.3 | 94.3 | 65.1 | 0.53 | 0.120 | 5.0 |
| 2 | 49 | 37.7 | 98.3 | 94.8 | 65.7 | 0.55 | 0.122 | 4.5 |
| 3 | 46 | 38.6 | 97.7 | 94.8 | 69.5 | 0.31 | 0.128 | 2.4 |

Titanium Dioxide

The titanium dioxide employed in the examples herebelow consists of 95% by weight of pure rutile $TiO_2$, with the remaining weight being accounted for in a surface treatment of alumina, zirconia and an organic surface treatment agent. This pigment features a volume median diameter $d_{50}$ of approximately 0.55 µm and a $d_{98}/d_{50}$ (Mal) of 1.98, and is provided in the form of an aqueous paste having a 75 wt-% solids content. By scanning electron microscope imaging, the particles appear to be in the range of 0.2 to 0.25 µm. The refractive index of $TiO_2$ is 2.7.

Example 1

The following example illustrates a comparative paint composition and paint compositions according to the invention. The formulated paints were applied to a contrast card in the necessary amounts in order to measure both gloss and opacity.

| Example | 1 | 2 | 3 | 4 |
|---|---|---|---|---|
| Comparison (CO)/Invention (IN) | CO | IN | IN | IN |
| Paint composition formulation | | | | |
| Water (g) | 134 | 120 | 111 | 108 |
| Hydrophilic copolymer dispersant, 50 wt-% solids content (g) | 6.4 | 6.5 | 6.5 | 6.5 |
| Ammonia, 24 wt-% (g) | 4 | 4 | 4 | 4 |
| Paraffin-based mineral oil mixture containing silicone (g) | 7 | 7 | 7 | 7 |
| Rheotech 2000 thickener from Coatex (g) | 15 | 15 | 15 | 15 |
| Propylene glycol (g) | 10 | 10 | 10 | 10 |
| Butyl diglycol (g) | 5 | 5 | 5 | 5 |
| Dipropylene Glycol n-Butyl Ether (g) | 10 | 10 | 10 | 10 |
| Ester alcohol with Mw = 216 g/mol (g) | 9 | 9 | 9 | 9 |
| Acrylate binder emulsion, 48 wt-% active content (g) | 550 | 557 | 557 | 557 |
| $TiO_2$ (g) | 250 | 218 | 218 | 218 |
| SMGCC1 (g) | | 39 | | |
| SMGCC2 (g) | | | 48 | |
| SMGCC3 (g) | | | | 51 |
| Reduction of $TiO_2$ (% weight) | 0 | 12.8 | 12.8 | 12.8 |
| PVC (%) | 21 | 21 | 21 | 21 |
| Properties on application of the paint formulation | | | | |
| Contrast ratio at 7.5 m²/l spreading rate | | | | |
| (%) | | 98.6 | 98.5 | 98.6 | 98.5 |
| Gloss obtained using a coater gap of 150 µm | | | | |
| 20° | | 51.8 | 50.6 | 50.6 | 55.7 |
| 60° | | 80.3 | 79.7 | 79.7 | 81.7 |
| 85° | | 93.6 | 95.9 | 96.2 | 96.8 |
| Gloss obtained using a coater gap of 300 µm | | | | |
| 20° | | 55.6 | 52.4 | 54.7 | 56.8 |
| 60° | | 79.4 | 78.7 | 80.1 | 80.5 |
| 85° | | 95.6 | 95.7 | 96.5 | 95.8 |

The results of the above table show that replacing a part of $TiO_2$ with the SMGCC according to the invention, and having $d_{98}/d_{50}$ values ranging from 2.4 to 5, results in coatings having essentially the same opacity (contrast ratio) as the comparison formulation having equal PVC but only $TiO_2$. Gloss values are observed to be equivalent or improved relative to the comparison formulation having equal PVC but only $TiO_2$.

The invention claimed is:

1. A process for preparing a glossing and opacifying coating composition comprising:
   mixing, with glossing and opacifying coating composition components, at least one submicron ground natural calcium carbonate (SMGCC) having a volume median particle diameter $d_{50}$ of 0.05 to 0.3 µm and a $d_{98}$ of less than or equal to 0.6 µm, and titanium dioxide, at a titanium dioxide:SMGCC weight ratio from 75:25 to 98:2, to obtain a glossing and opacifying coating composition having a pigment volume concentration (PVC) of from 5% up to a critical pigment volume concentration (CPVC), and wherein the glossing and opacifying coating composition, applied to a contrast card to form a layer having a thickness of 150 μm or 300 μm, has a gloss that is within ±3% of the gloss of the same composition and thickness in which the SMGCC is fully replaced with the titanium dioxide, when gloss is measured either at a 60° or an 85° incident angle according to DIN 67530.

2. The process according to claim 1, wherein the SMGCC is provided in the form of an aqueous suspension or dispersion.

3. The process according to claim 1, wherein the glossing and opacifying coating composition components comprises at least one resin.

4. The process according to claim 3, wherein the resin is a latex and/or acrylate-based binder.

5. The process according to claim 4, wherein the acrylate-based binder is in the form of an aqueous emulsion.

6. The process according to claim 1, wherein the glossing and opacifying coating composition has a PVC of from 10 to 30 vol.-%.

7. The process according to claim 1, wherein the glossing and opacifying coating composition has a PVC of from 15 to 25 vol.-%.

8. The process according to claim 1, wherein the glossing and opacifying coating composition has a PVC of from 17 to 21 vol.-%.

9. The process according to claim 1, wherein the SMGCC has a volume median diameter $d_{50}$ of 0.08 to 0.3 μm.

10. The process according to claim 1, wherein the SMGCC has a volume median diameter $d_{50}$ of 0.1 to 0.2 μm.

11. The process according to claim 1, wherein the SMGCC has a $d_{98}/d_{50}$ of greater than 3.

12. The process according to claim 1, wherein the SMGCC has a $d_{98}$ of less than or equal to 0.4 μm.

13. The process according to claim 1, wherein the titanium dioxide:SMGCC weight ratio is from 75:25 to 90:10.

14. The process according to claim 1, wherein the titanium dioxide:SMGCC weight ratio is from 80:20 to 85:15.

15. The process according to claim 1, wherein the glossing and opacifying coating composition components are selected from the group consisting of one or more of a resin, a binder, a pigment, a defoamer, a levelling agent, a flatting agent, a preservative, an optical brightener, a light stabilizer, a reheological additive, a thickener, a dispersant, a solvent, a filler, an anti-settling agent, a surfactant, a metal, and a UV absorber.

* * * * *